United States Patent [19]

Stankewitz

[11] 4,163,150
[45] Jul. 31, 1979

[54] PROCESS AND APPARATUS FOR AUTOMATICALLY REALIZING KÖHLER'S PRINCIPLE OF ILLUMINATION

[75] Inventor: Hans-Werner Stankewitz, Steindorf, Fed. Rep. of Germany

[73] Assignee: Ernst Leitz Wetzlar GmbH, Wetzlar, Fed. Rep. of Germany

[21] Appl. No.: 837,402

[22] Filed: Sep. 28, 1977

[30] Foreign Application Priority Data

Oct. 1, 1976 [DE] Fed. Rep. of Germany ....... 2644341

[51] Int. Cl.² .............................................. G01J 1/32
[52] U.S. Cl. ................................... 250/205; 250/201; 350/17
[58] Field of Search .................. 250/201, 205; 350/87, 350/40, 17

Primary Examiner—David C. Nelms
Assistant Examiner—Darwin R. Hostetter
Attorney, Agent, or Firm—Schwartz, Jeffery, Schwaab, Mack, Blumenthal & Koch

[57] ABSTRACT

A process and apparatus is disclosed for automatically realizing Köhler's Principle of Illumination in microscopes and the like in which the illumination means of the microscope is adjusted to fully take Köhler's Principle of Illumination into account. Optimization is achieved by sensing the extent of illumination, preferably with photoelectric type sensors, which generate signals proportional to the brightness of illumination. The signals are converted into control signals in a converter stage which in turn control motor means which serve to adjust the openings of at least one diaphragm and/or the focal length of an illumination pancratics in the system. The sensing means are adjustably positioned so that it may be moved depending on the objective and magnification used.

22 Claims, 9 Drawing Figures

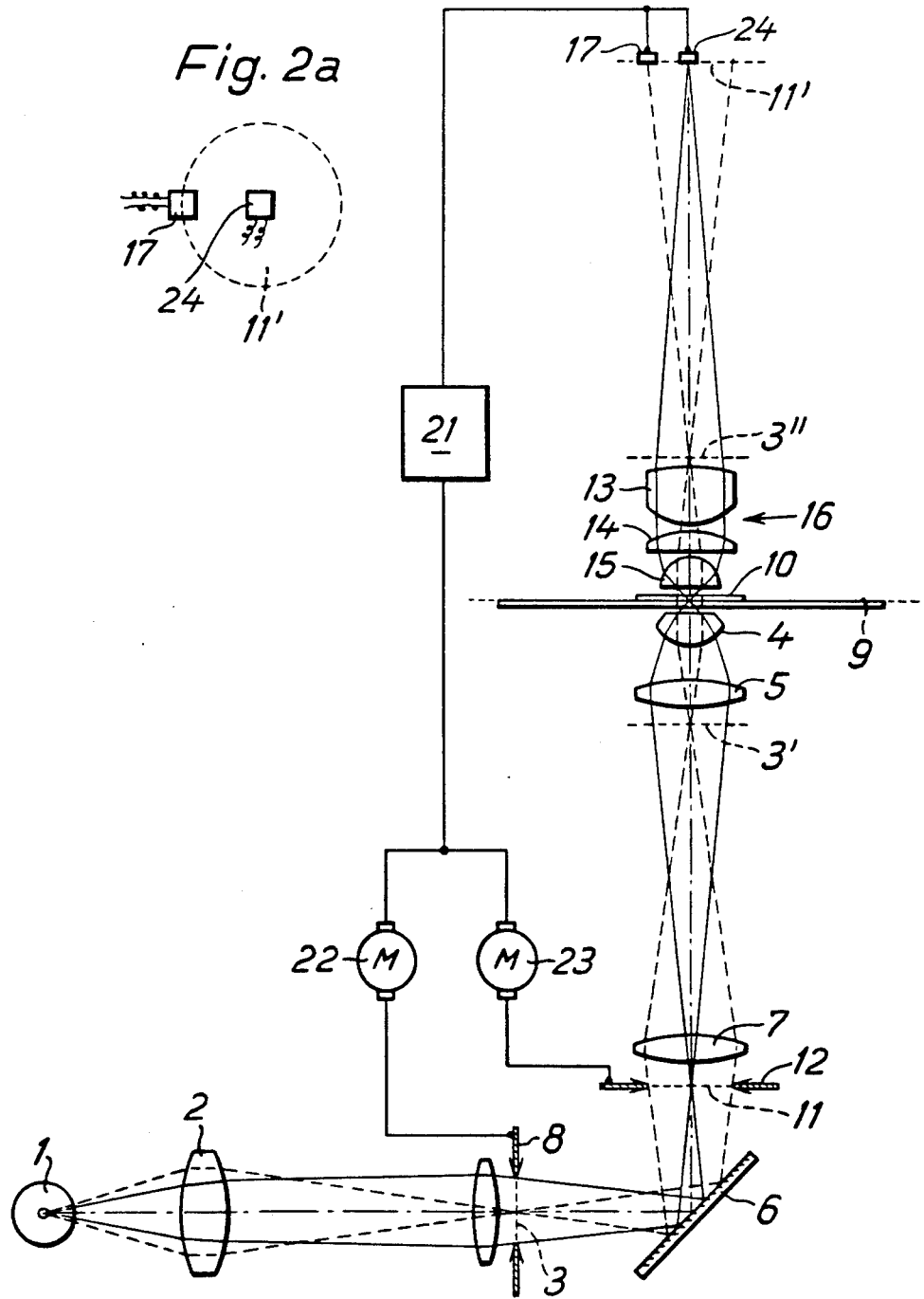

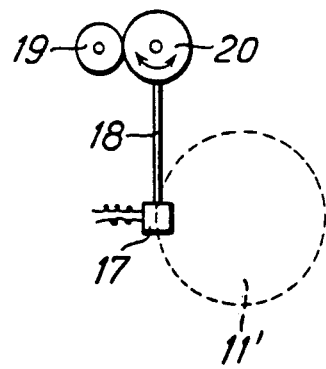
Fig. 3a
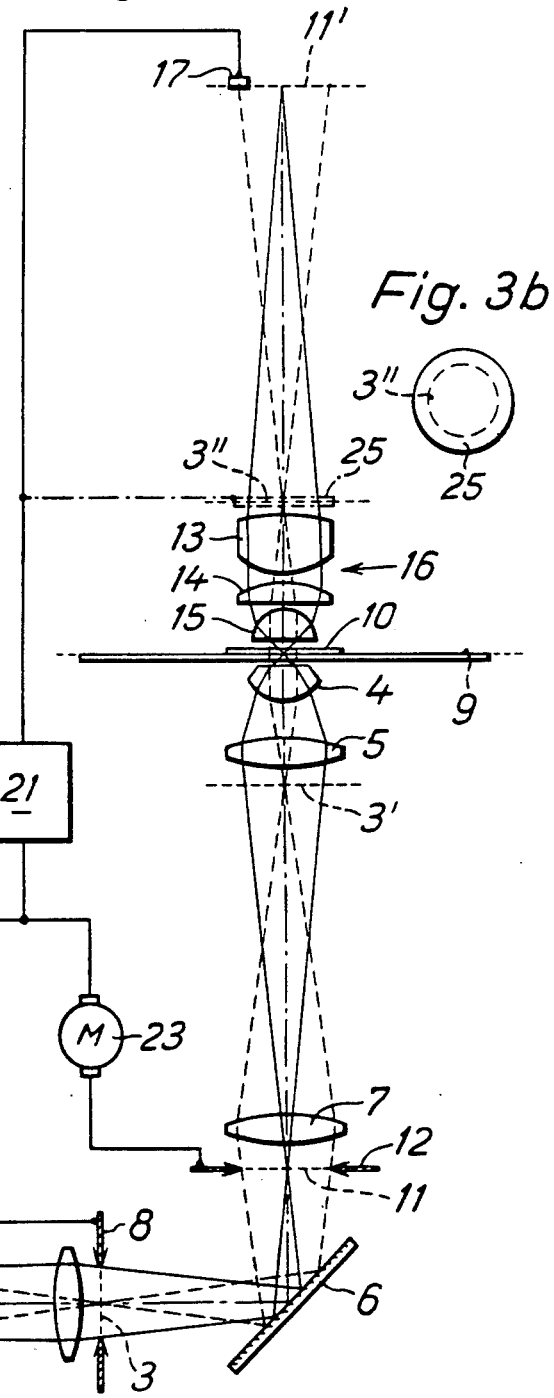
Fig. 3
Fig. 3b

PROCESS AND APPARATUS FOR AUTOMATICALLY REALIZING KÖHLER'S PRINCIPLE OF ILLUMINATION

BACKGROUND OF THE INVENTION

1. Field of the Invention

The invention relates to a process and apparatus for automatically taking advantage of Köhler's Principle of Illumination in microscopes having a variable magnification system as well as an illumination system.

2. Description of the Prior Art

In the generation of a microscopic image the aperture and correction of the imaging optics determine the power of resolution as well as the contrast. However, the highest resolution and best contrast are obtainable only by using an optimally adapted and correctly adjusted illumination system. In such a system illumination of the object is required which completely and uniformly illuminates the field of vision covered by the objective used with an aperture still acceptable by the objective, i.e., an aperture resulting in an optimum ratio between resolution and contrast.

The simplest manner for obtaining this type of illumination has entailed using a collector and a condenser, both having constant focal length.

When using microscopes having variable magnification, collectors and condensers are designed for the largest possible field of vision and the largest possible aperture. Nevertheless, because the field of vision to be illuminated and the aperture required vary with each change of the objective, the illumination must be correspondingly adapted by means of diaphragms arranged in the planes of the field of view and the aperture so as to avoid, for example, a reduction in image contrast through over-illumination. Such an arrangement is disadvantageous, since in most cases the total potential optical conductance of the illumination system cannot be fully utilized.

For this reason, it has previously been proposed to provide illumination systems with variable focal lengths in order to be able to contain continuous variation of the field of vision and of the aperture. Yet, even though such a system makes it possible to adapt the field of vision and the aperture to the objective being used, while at the same time taking advantage of the total optical conductance, the fact that various adjustments must be made manually is a disadvantage. Such an apparatus involves time consuming adjustment because of the accuracy and care involved in properly setting the device. Additionally, the final results depend to a great extent on the alertness and skill of the operator. The disadvantage of such a system becomes readily apparent when performing reproducible comparative observations.

In an attempt to overcome the above disadvantages, German Auslegeschrift No. 2,219,521 discloses an adjustment drive which connects the adjustable illumination system with the objective changing device. The drive is controlled by scanning elements arranged on the objective changing device and/or on the objectives themselves.

However, the equipment necessarily involved with such a device as well as the additional time and care necessary for the alignment of additional objectives to be set into the changing device makes such a system undesirable.

SUMMARY OF THE INVENTION

It is therefore an object of the invention to provide a process for use with microscopes which makes it possible to take full advantage of Köhler's Illumination Principle simply and effectively regardless of which objective is set into the microscope.

It is a further object of the invention to provide a microscope apparatus in which the illumination is automatically controlled to fully take Köhler's Illumination Principle into account and which requires a minimum of skill and effort in properly using the device.

It is yet another object of the invention to automatically adjust the illumination of a microscope having a variable magnification by automatically varying the aperture with the field of vision.

Furthermore, it is yet another object of the invention to utilize photoelectric sensors placed in the viewable field of vision, also known as "the viewable portion of the viewing plane" and in other planes conjugated thereto for sensing the extent of illumination. The photoelectric sensors emit signals which are converted into instructions for automatically adjusting diaphragms located in the aperture and variable luminous field and the focal length of an illumination pancratics as well when used in a microscope.

It is still another object of the invention to provide a support system for said photoelectric sensors for maintaining at least one of them at the edge of the field of illumination so as to sense the extent of illumination in this area and control the diaphragms accordingly. Preferably, the sensors are movably supported so that their position may be changed depending on the magnification and objective used.

Finally, yet another object of the invention is to make it possible to realize Köhler's Principle of Illumination in a simple manner in microscopes without requiring any adjustment by the operator. This eliminates a multitude of sources of error. In addition, besides the not insubstantial savings in time, the process yields the absolute reproducibility of illumination once set. This places the user in a position where he can concentrate completely on the observation of the object, without having to occupy himself with more than a minimum of technical requirements.

The objects are attained in accordance with the invention by measuring the existing image brightness in at least the diaphragm plane of the luminous field (field of view) or in at least one plane conjugated thereto with a sensing means which generates photoelectric signals which in turn adapts the illumination to the field of vision for the magnification selected. The signals themselves are converted into control signals for controlling the diaphragms by means of conventional devices such as a bridge circuit known per se from the balancing of which the signals controlling the diaphragms are derivable. As a result of the control signals emitted by the converter mechanism, the illumination beam is altered in the diaphragm plane of the luminous field (field of view) as well as the aperture.

When using microscopes having an illumination system with a variable focal length, the process of the invention entails converting the signal obtained from the sensing means into control signals which are used to vary the focal length of the illumination system or to at least limit the illumination beam itself, in a continuous manner. These adjustments may take place continuously in either or both of the aperture and the luminous field diaphragm planes.

As a further aspect of the invention, the microscope is provided with means for generating photoelectric signals depending on the brightness of the image in the luminous field and aperture diaphragm planes or in planes conjugated thereto.

The invention comprises an arrangement for the process described above in which a photoelectric receiver system is provided at least in the luminous field diaphragm plane or in a plane conjugated thereto for generating output signals proportional to the image brightness existing in each of these planes. The signals are then converted by a converter stage connected in series with the photoelectric receiver system into control signals to via an adjusting device adapt the illumination to the field of vision of the magnification selected. For this reason, a variable diaphragm may be arranged both in the luminous field diaphragm plane or in conjugated planes and in the aperture to be controlled by the signals generated.

When using the above arrangement in a microscope having an illumination system with a variable focal length at least one photoelectric receiving system is provided in the luminous field diaphragm plane or in at least one plane conjugated thereto whose output signal is proportional to the image brightness existing in said planes. The signal is then converted by a converter stage connected in series with the photoelectric receiver system into control signals which by means of adjustment devices, adjust the optical members arranged in the illumination system so as to vary the focal length of the system or at least one diaphragm each in of the luminous field diaphragm plane and the aperture diaphragm plane or planes conjugated with these planes.

As a part of the invention, the photoelectric receiver system producing the signals which control the diaphragm is at least partially arranged at the edge of the field of view or at the edge of a plane conjugated thereto. By the term "conjugated plane" is meant a plane distinctly connected to a primary plane as for instance in geometric-optically imaging object plane and image plane which are imaged into each other.

According to the invention it is possible to provide at least two photoelectric receiver systems, one of which is arranged at the edge and the other in the center of the luminous field diaphragm plane or one of which is arranged at the edge and the others in the center of a conjugated plane thereto. The output signals of this system control a variable diaphragm either located in the luminous field diaphragm plane or in the aperture diaphragm plane.

In an alternative embodiment, the photoelectric receiver system controlling the luminous field diaphragm is located at the edge of the field of view-or luminous field diaphragm plane and the photoelectric receiver system controlling the aperture diaphragm is located in the aperture diaphragm plane or in a plane conjugated thereto. In such an embodiment, it is necessary that the light sensitive surface of the photoelectric receiver system arranged in the objective pupil conjugated to the plane of the aperture diaphragm be larger than the surface of the objective pupil itself.

Since, for purposes of "microphotometry", it is necessary that the luminous field diaphragm be opened so that only slightly more of the object field is illuminated than is limited by the variable measuring field diaphragm, the photoelectric receiver system be arranged at the edge of the field of view or, as it is sometimes called, "the viewable portion of the viewing plane", in a movable manner so that it can be switched to different fields of view.

As provided for by the invention, the diaphragms and focal length are adjusted to take full advantage of Köhler's Principle of Illumination for which an image of the light source of the illumination device is formed by its collector lens in the front focus of the device's condensor lens for causing parallel light fluxes to illuminate the object and for which the condenser lens is forming an image of the variable field of vision stop in the object plane.

In fulfilling the previously set forth objects of the invention in their broadest sense, the invention comprises a process for automatically adjusting the illumination system of a microscope having a variable magnification system. First, the extensive illumination is measured in the viewable portion of the viewing plane or in a plane conjugated thereto with a sensing means which emits a measurement signal. Next, the measurement signal is converted into a control signal which is fed through an adjustment means which automatically adjusts the degree of illumination in accordance with Köhler's Principle in response to the magnification selected. The microscope used may have a plurality of objectives for varying the magnification and as part of the invention, the degree of illumination is sensed at the edge of the movable portion of the viewing plane for each objective. The sensing means may comprise photoelectric sensors of the conventional type. Measurement of the illumination is performed in the viewable plane of the viewing portion of the microscope or in a plane conjugated thereto. In a preferred embodiment, the microscope comprises an aperture diaphragm and a luminous field diaphragm and the adjustment means adjusts both of the diaphragms in response to signals received from the converting means. In yet another embodiment of the invention, the microscope comprises an illumination means having an adjustable focal length. The focal length is varied by the adjustment means in response to control signals received from the converting means in accordance with Köhler's principle.

In its most basic form, the apparatus of the invention comprises a variable magnification microscope having an illumination means for illuminating an object to be viewed, a sensing means for sensing the image brightness of the illumination provided by said illumination means and for emitting a signal corresponding to the brightness of illumination, and a converter means for converting the signals received from the sensing means so as to generate control signals for automatically adjusting the illumination in response to the magnification of the microscope in accordance with Köhler's principle.

BRIEF DESCRIPTION OF THE DRAWINGS

FIG. 2 shows an arrangement using two photoelectric receivers in a plane of the luminous field diaphragm (field of view);

FIG. 2a shows a top view of FIG. 2;

FIG. 3 shows an arrangement according to FIG. 2, but with sensors in the luminous field and aperture diaphragm planes;

FIG. 3a shows a top view of the luminous field (field of view) in detail;

FIG. 3b shows a plane conjugated with the aperture diaphragm plane;

DESCRIPTION OF THE PREFERRED EMBODIMENTS

Figure 1A:
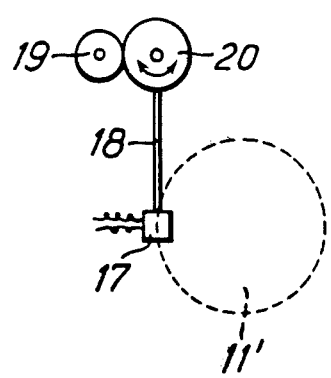
FIG. 1a shows a detailed top view according to FIG. 1.
Figure 1:
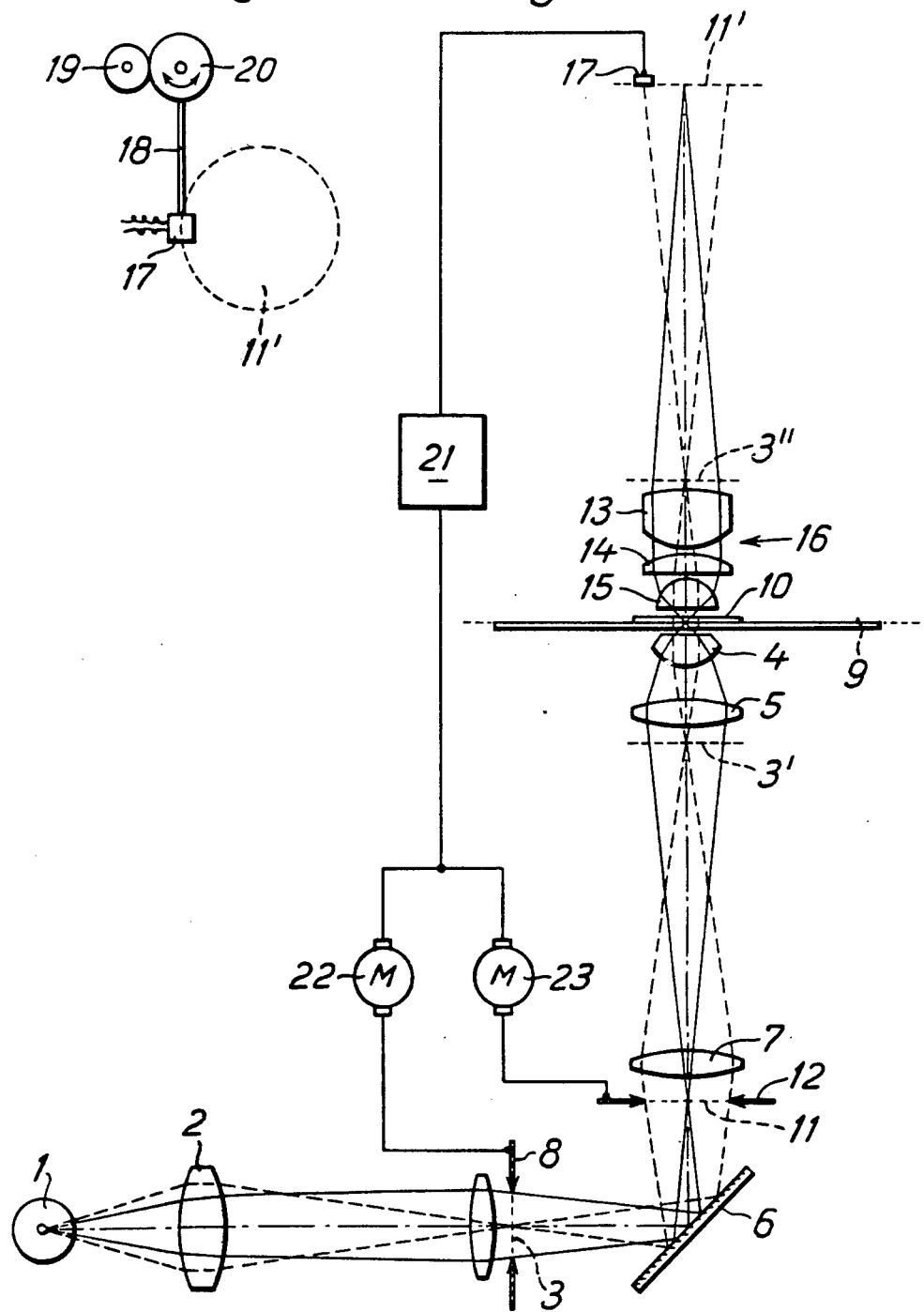
FIG. 1 shows an arrangement according to the invention using a photoelectric receiver.

FIG. 1 illustrates illumination in accordance with Köhler's Principle wherein a source of light 1 is reproduced by a collector 2 represented by a lens in an intermediate image plane 3 and imaged by way of a mirror 6 and an optical system 7 in a focal plane 3' of a condenser composed of lenses 4 and 5.

To adjust the amount of light in the beam path within the entire optical system, a variable diaphragm 8, arranged for adjusting the aperture, hereafter referred to as the aperture diaphragm, is placed in the focal plane 3' of the condenser 4,5 or in the intermediate image plane 3.

The image projected by the collector 2 and the optical system 7 in the plane 3' of the source of light 1 is reproduced by the condenser 4,5 in the infinite so that the beam exiting from the condenser 4,5 consists of nearly parallel rays. These rays illuminate an object 10 placed on the plane 9 for the purposes of observation.

A variable luminous field diaphragm 12 is provided in a plane 11 which follows the collector 2 in the direction of the flow of light. In accordance with Köhler's Principle, this diaphragm acts to adapt a luminous field in the object plane 9 to the viewable field of vision 11' which in turn depends on the objective 16 consisting of the lenses 13, 14, and 15 which represent a plane conjugated with the plane 11. For this purpose, an image of the diaphragm 12 is reproduced for the condensor 4,5 in the object plane 9.

The automatic adjustment of the illumination to the existing objective will now be described.

A photoelectric receiver 17 is located at the edge of the field of view or, as it is sometimes called, "the viewable portion of the viewing plane" 11', which is more clearly shown in the top view of FIG. 1a. Light from the illumination in the field of view 11' falls on the photoelectric receiver 17 which in turn emits electric signals at its outlets proportional to the brightness of the light. These signals are then transmitted to a converter stage 21 where the signals are converted to control signals. The converter stage may comprise any conventional type of converter such as a bridge circuit from the balancing of which the signals controlling the diaphragms are derivable. The control signals are then sent to manipulation means such as a servo motor 22 which regulates the aperture diaphragm 8 so that the aperture of the objective 16 is illuminated approximately two thirds. Next, with the aid of the control signals produced in the converter stage 21 another servo motor 23 serves to regulate the luminous field diaphragm so that the luminous field in the object coincides with the field of view. Preferably, the photoelectric receiver 17 is supported by the lever 18 which is rotatable in the direction of the dual arrow shown in FIG. 1a. The lever may be rotated in case of a change in the occulars or the photoelectric setting of the measuring diaphragm by way of the gear 19, 20.

FIG. 2 shows a second embodiment which differs from the embodiment shown by FIG. 1 in that another photoelectric receiver sensor 24 is placed in the center of the field of view 11'. The output signals from this sensor or receiver are proportional to the brightness in the field of view and serve exclusively to control the aperture diaphragm 8 by way of the servo motor 22 after the signals have been converted in the converter stage 21. The output signals of the receiver 17 serve, on the other hand, to control only the opening of the illuminous field diaphragm.

When an arrangement of the above type is to be used in microphotometry to obtain maximum brightness in a small field, an arrangement according to FIG. 3 is recommended. In this embodiment, the magnitude of the aperture diaphragm 8 is controlled by the output signals of a photoelectric receiver 25 (FIG. 3b). The signals emitted by the photoelectric receiver 25 are not based on the brightness in the center of the field of view 11' (FIG. 3a), but rather on the brightness at the pupil 3" in a plane conjugated with the aperture diaphragm plane 3. It should be noted, however, that in order to properly capture the brightness or illumination, the photosensitive surface of the receiver 25 should be larger than the pupil 3".

Figures 4, 4A:
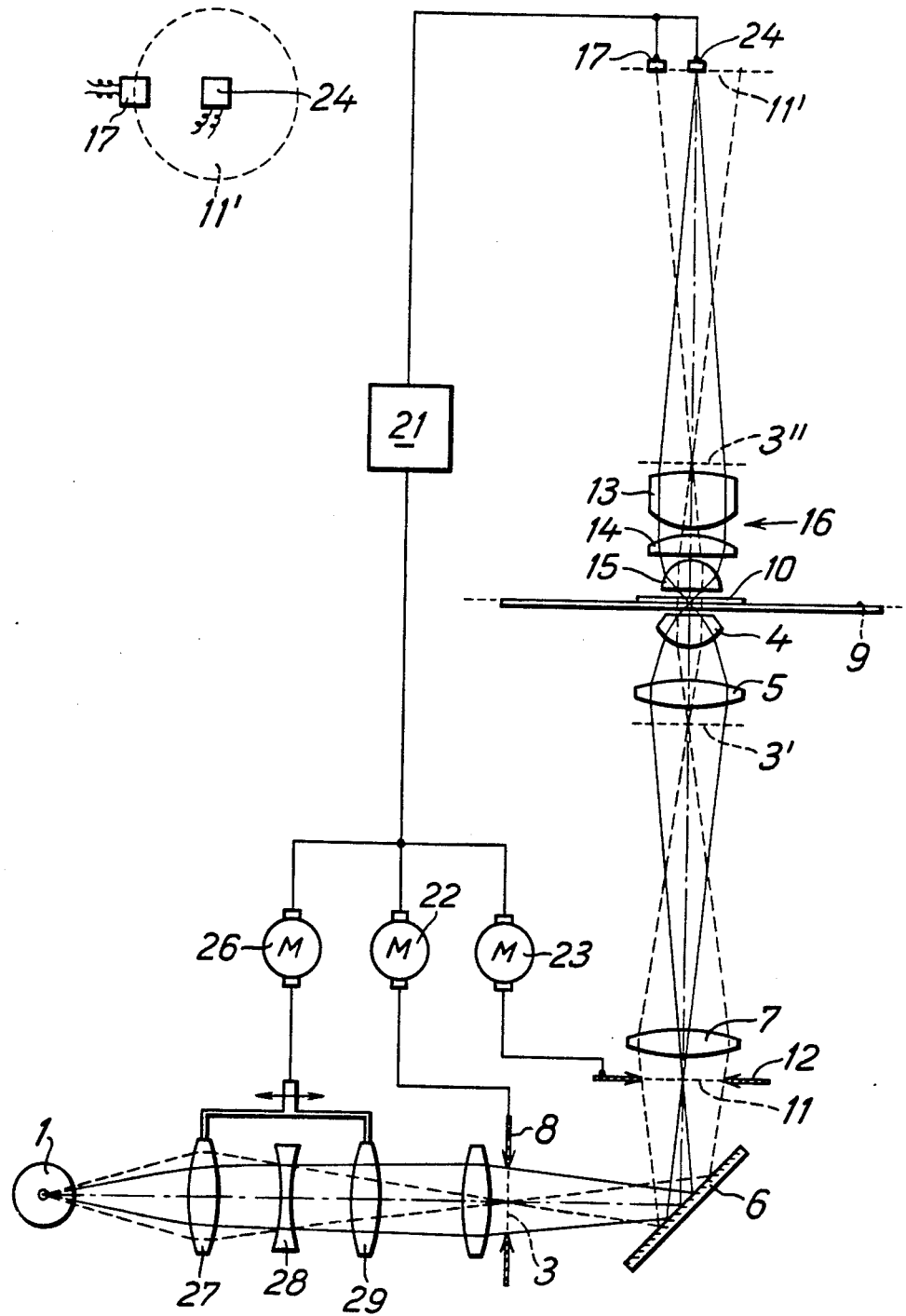
FIG. 4 shows an arrangement with an illuminating system having a variable focal length.
FIG. 4a is a top view of FIG. 4.

FIG. 4 illustrates another improvement of the arrangements previously described. In this embodiment, an illumination pancratics, which comprises lenses 27, 28 and 29 which is movable in the direction of the double arrow forms a part of the arrangement. The pancratics serves to adapt the aperture 8 and luminous field diaphragm 12. The pancratics can be controlled by way of a servo motor 26 which is fed the control signals produced by the photoelectric receivers 17 and 24 (FIG. 4a) which are subsequently processed in the converter stage 21.

The embodiment of 4a functions such that with a change of objectives 16, the aperture diaphragm 8 opens automatically. The photoelectric receiver 17 (FIG. 4a) produces signals proportional to the brightness of the illumination of the field of view 11'. These signals are sent to a converter stage 21 which then sends control signals to a servo motor 23 for control of the luminous field diaphragm 12.

The signals emitted by the two receivers or sensors set the pancratics 27, 28, and 29 after conversion in the converter stage 21 shifts the focal length of the illumination system via the servo motor 23 to provide a bright and uniformly lit field of view from the center of which the photoelectric receiver or sensor 24 generates signals to control the aperture diaphragm 8 by way of servo motor 22. In order to fully utilize the stopped down source of light, the setting of the pancratics for a bright field of view 11' is corrected by repeating the performance described above.

The apparatus and method of the invention have been disclosed and exemplified in the drawings by certain preferred embodiments. It is to be understood however that the microscope and the illumination method of the invention are not limited to only those embodiments disclosed and that the invention covers all equivalents and alternative embodiments falling within the scope of the claims.

What is claimed is:

1. A process for automatically adjusting the illumination system of a microscope having a variable magnification system which comprises the steps of:
   (a) measuring the extent of illumination of the viewable portion of the viewing plane or planes conjugated thereto with a sensing means which emits a measurement signal;
   (b) converting said measurement signal into a control signal; and
   (c) feeding said control signal to adjustment means for automatically adjusting said degree of illumination in accordance with Köhler's Principle in response to the magnification chosen, by varying at least one of (i) a diaphragm or (ii) the focal length.

2. The process as defined in claim 1, wherein said microscope comprises a plurality of objectives for varying said magnification, said process further comprising sensing the degree of illumination at the edge of said viewable portion of said viewing plane for each objective.

3. The process as defined by claim 1, wherein said microscope comprises at least one of an aperture diaphragm and a luminous field diaphragm and said process further comprises the step of adjusting said degree of illumination by adjustment means which comprise means for varying the setting of at least one of said aperture diaphragm and said luminous field diaphragm.

4. The process as defined by claim 3, wherein said microscope comprises both an aperture diaphragm and a luminous field diaphragm and said adjustment means adjusts both of said diaphragms in response to signals received from said converting means.

5. The process as defined by claim 1, comprising measuring said illumination in the viewable plane of the viewing portion of said microscope or in a plane conjugated thereto.

6. The process as defined by claim 1 wherein said sensing means is a photoelectric senser.

7. The process as defined by claim 1, wherein said microscope comprises an illumination means having an adjustable focal length and said adjustment means varies said focal length in response to said control signals in accordance with the Köhler's Principle.

8. The process as defined in claim 1, wherein said sensing means measures the brightness of the illumination in the luminous field diaphragm, the aperture diaphragm plane or planes conjugated thereto.

9. A variable magnification microscope comprising:
   (a) an illumination means for illuminating an object to be viewed;
   (b) a sensing means for sensing the image brightness of said illumination provided by said illumination means and for emitting a signal corresponding to said brightness of illumination;
   (c) a converter means for converting said signals received from said sensing means so as to generate control signals for automatically adjusting the illumination in response to the magnification of the microscope in accordance with Köhler's Principle, by varying at least one of (i) a diaphragm or (ii) the focal length.

10. The microscope as defined by claim 9, comprising a luminous field diaphragm plane, an aperture diaphragm plane and planes conjugated thereto and wherein diaphragms are provided in at least on of said planes, converter means being operatively connected to said diaphragm for adjusting said diaphragms in response to said illumination.

11. The microscope as defined by claim 10, wherein said diaphragm is variable for adjusting the amount of illumination in each of said planes.

12. The microscope as defined by claim 10, wherein said sensing means comprises at least one photoelectric sensor located in said luminous field diaphragm plane or in a plane conjugated thereto for sensing the brightness of said illumination, said photoelectric sensors emitting signals proportional to said brightness which may be converted into control signals for adjusting said diaphragms in response to said illumination.

13. The microscope as defined by claim 10, wherein said sensing means are supported by positioning means for automatically positioning said sensing means at the edge of said viewable portion of said viewing plane.

14. The microscope as defined by claim 9, wherein said sensing means are supported by positioning means for automatically positioning said sensing means at the edge of said viewable portion of said viewing plane.

15. The microscope as defined by claim 9, which comprises a luminous field diaphragm plane and wherein said sensing means comprises at least one photoelectric system located in said viewable portion of said viewing plane or in a plane conjugated thereto, said photoelectric system being selected such that the output signals from said sensing means are proportional to the image brightness within said plane.

16. The microscope as defined by claim 15, wherein said sensing means are supported by positioning means for automatically positioning said sensing means at the edge of said viewable portion of said viewing plane.

17. The microscope as defined by claim 15, which comprises at least two photoelectric systems, said systems being arranged such that one of said systems is at the edge of said viewable portion of said viewing plane or of a plane conjugated thereto and the other photoelectric system is arranged in the center of said viewable portion of said viewing plane or in a plane conjugated thereto.

18. The microscope as defined by claim 9, which comprises an aperture diaphragm and a sensing means comprising two sensors; a first sensor being provided at the edge of the viewable portion of the viewing plane of said microscope and a second sensor being arranged in the plane of said aperture diaphragm or in a plane conjugated thereto.

19. The microscope as defined by claim 18, wherein said first sensor is connected to a converter means operatively connected to a luminous field diaphragm for sensing the extent of illumination in said viewing plane and adjusting said luminous field diaphragm in accordance with Köhler's Principle and said second sensor is connected to a converter means operatively connected to said aperture diaphragm for sensing the extent of illumination in said diaphragm plane and adjusting said aperture diaphragm in accordance with Köhler's Principle.

20. The microscope as defined by claim 19, wherein said sensors are photoelectric sensors.

21. The microscope as defined by claim 20, wherein said microscope comprises an objective and said photoelectric receiver in said aperture diaphragm plane has a photosensitive surface which is greater than the pupil of said objective.

22. The microscope as defined by claim 9, wherein said converter means are connected to means for varying the focal length of the illumination system.

* * * * *